(12) United States Patent
Wang

(10) Patent No.: US 9,302,572 B2
(45) Date of Patent: Apr. 5, 2016

(54) VEHICLE HAIL PROTECTIVE COVER

(71) Applicant: Jilin Wang, Frisco, TX (US)

(72) Inventor: Jilin Wang, Frisco, TX (US)

( * ) Notice: Subject to any disclaimer, the term of this patent is extended or adjusted under 35 U.S.C. 154(b) by 0 days.

(21) Appl. No.: 14/164,646

(22) Filed: Jan. 27, 2014

(65) Prior Publication Data

US 2014/0312647 A1    Oct. 23, 2014

Related U.S. Application Data

(60) Provisional application No. 61/849,919, filed on Feb. 5, 2013.

(51) Int. Cl.
*B60J 11/04* (2006.01)

(52) U.S. Cl.
CPC ....................................... *B60J 11/04* (2013.01)

(58) Field of Classification Search
CPC ........................................................ B60J 11/04
USPC ............. 296/136.01, 136.02, 136.07, 136.09, 296/136.1, 136.11, 136.12, 136.13
See application file for complete search history.

(56) References Cited

U.S. PATENT DOCUMENTS

| 4,519,644 | A |   | 5/1985 | Song |
|-----------|---|---|--------|------|
| 4,951,993 | A | * | 8/1990 | Taboada ................... 296/136.13 |
| 5,242,206 | A | * | 9/1993 | Heck ........................ 296/136.02 |
| 5,401,074 | A |   | 3/1995 | Timer-man |
| 5,413,396 | A | * | 5/1995 | Poznansky et al. ...... 296/136.13 |
| 5,890,525 | A | * | 4/1999 | Shores ......................... 150/166 |
| 6,044,881 | A | * | 4/2000 | Welch et al. ................. 150/166 |
| 6,056,347 | A | * | 5/2000 | D'Adamo ................ 296/136.02 |
| 6,220,648 | B1 |  | 4/2001 | Daniel |
| 6,439,644 | B1 |  | 8/2002 | Jester |
| 2011/0140478 | A1 | * | 6/2011 | Devereaux ............... 296/136.02 |
| 2014/0015274 | A1 | * | 1/2014 | Banda ...................... 296/136.02 |

\* cited by examiner

*Primary Examiner* — H Gutman

(74) *Attorney, Agent, or Firm* — Frisco Patent Services, PLLC.; Henry A. Thomas

(57) ABSTRACT

The present invention includes a durable, weather resistant, and light weight apparatus for covering a vehicle and providing protection from objects that might strike and damage the exterior surfaces of the vehicle. The object of this invention is to provide a vehicle cover which covers both the horizontal and vertical surfaces of a vehicle, which can be deployed by a single person, folded for easy deployment, retrieval and storage, and which can be stretched or compressed to fit various sizes of automobiles while maintaining its protective effectiveness.

3 Claims, 9 Drawing Sheets

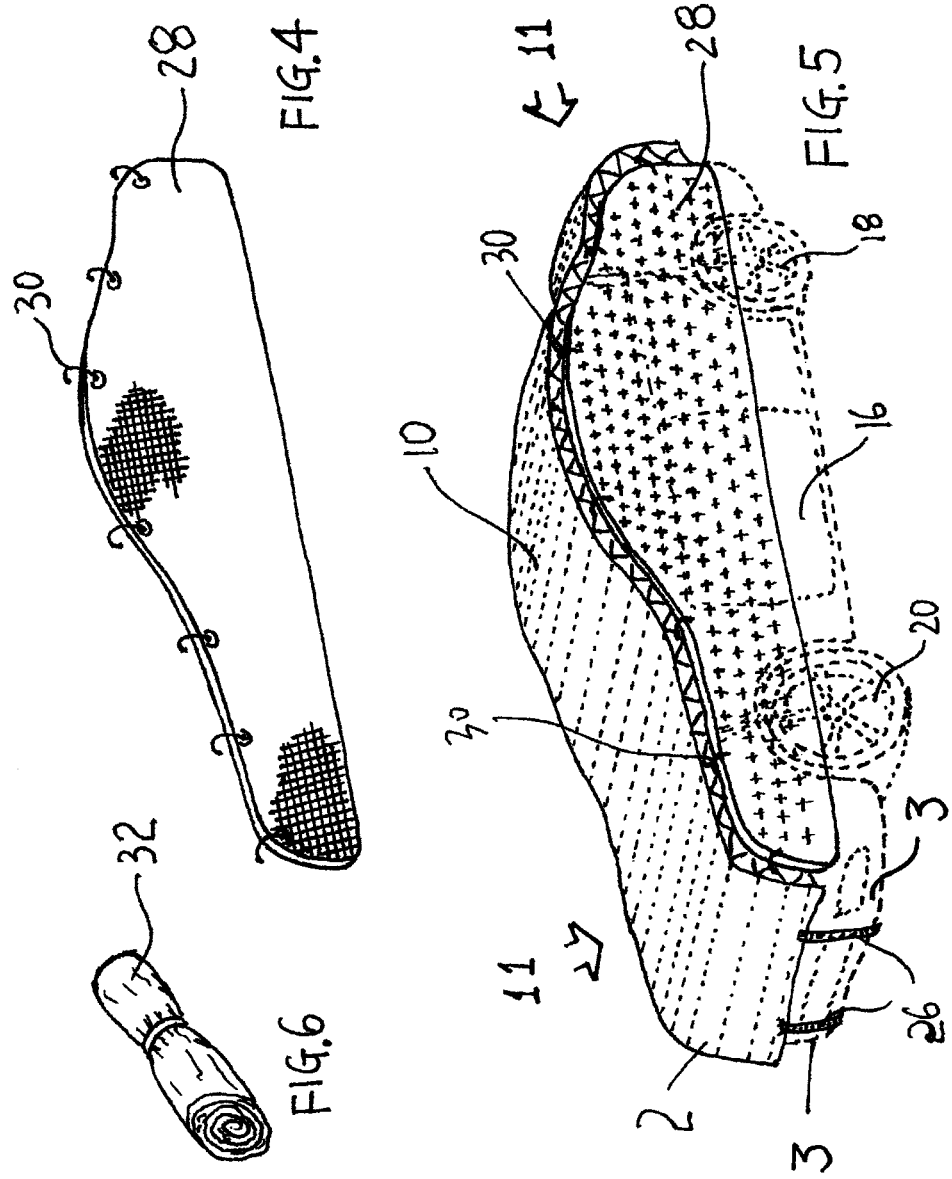

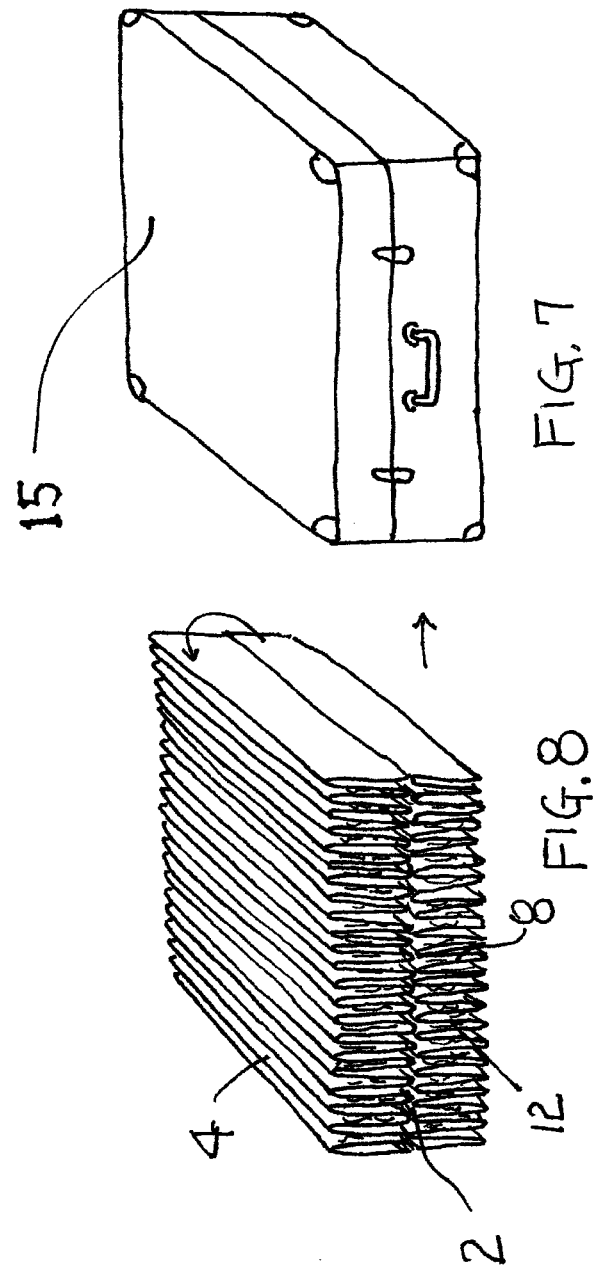

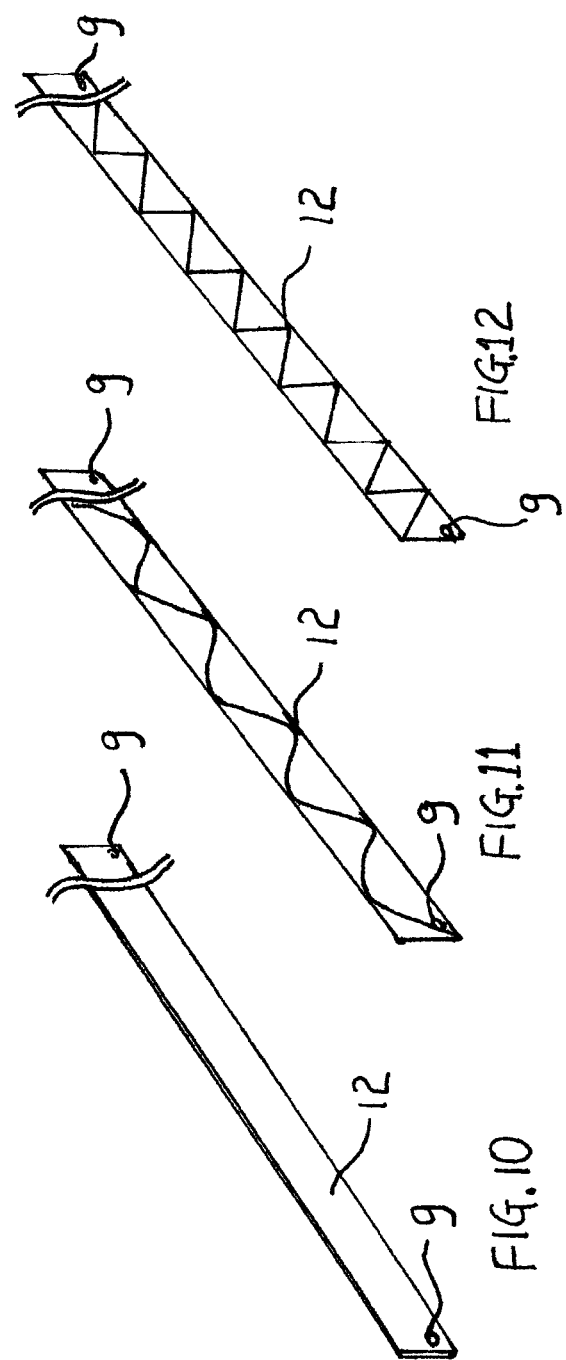

VEHICLE HAIL PROTECTIVE COVER

CROSS-REFERENCE TO RELATED APPLICATION 35 USC §119(e)

Benefit is claimed of the previous filed provisional application identified as U.S. provisional application for patent 61/849,919 filed on Feb. 5, 2013, by the same inventor, which is hereby incorporated by reference, claiming priority.

FIELD OF INVENTION

This invention relates to protective covers for vehicles and more specifically to vehicle hail protective covers for protecting a vehicle from hail and/or other falling objects.

BACKGROUND OF INVENTION

The nation has experienced severe hailstorms that are occurring frequently, with greater intensity and affecting many areas of the country. Paid losses due to hail damage amounted to a sheer $10.4 billion in Texas only for the period 1999 to 2011, exceeding the amount of paid losses caused by water ($8.9 billion), fire ($5.9 billion), or hurricanes and tornados combined ($6.7 billion, respectively $3.1 billion) for the same period. The frequency of intense hailstorms occurring is on the rise in all states. The National Insurance Crime Bureau (NICB) reported in July 2013 that insurance claims resulting from hailstorm damage increased 84 percent in 2012 from their 2010 level.

A protective vehicle cover is an apparatus that is used to isolate the exterior surfaces of the vehicle from objects falling from the sky, blown by the wind or otherwise set in motion on a collision course with a vehicle; which, upon impact would damage the paint, dent body panels or break glass, or possibly cause similar damage to exposed accessories applied to the exterior of the vehicle. Such protective covers, when deployed, form a barrier or cushion between the surfaces of the vehicle to be protected and the elements and objects commonly found to be potential hazards to an uncovered vehicle.

There are several protective vehicle covers currently available; traditionally, people have used various techniques, including but not limited to, applying forced air into pockets underneath a fabric to form cushioning from falling objects, positioning foam stand-offs to support a fabric shield above the exterior surfaces to deflect falling objects, assembling frame based apparatus to form a cocoon around the vehicle, or using covers made from rigid impact resistant/absorbing materials to deflect and/or absorb the impact from falling objects. The traditional type of vehicle covers described above, sacrifice ease of use, effectiveness and affordability in direct proportion to the level of protection provided.

For example, a "Protective hail cover for vehicle" is presented in U.S. Pat. No. 6,044,881. This device comprises a shell and inflatable tubes, it is not easily deployed or removed due to efforts needed to inflate and deflate the tube with an air compressor pump or other means. Overtime and with multiple uses, air leaks can develop resulting in loss of effective protection from falling objects or increased maintenance costs to constantly repair the cover.

U.S. Pat. No. 5,401,074 describes a "Hail protective vehicle cover". This device includes a sheet of cloth and several foam runners. The foam runners create the space between the top of the vehicle and the sheet of cloth which is intended to absorb the energy from falling objects. In reality, the tremendous impact of the large hailstones may still possibly reach the exterior surface of the vehicle due to the elasticity of the cloth and void spaces between the runners. This type of cover also occupies more storage space due to the rigid nature of the runners.

U.S. Pat. No. 4,519,644 "Foldable vehicle cover storable on vehicle". This device may provide substantial level of protection to a vehicle, but its construction of using C-frame with protective fabric is relatively complex, and it consists of many working parts resulting in higher costs. Also, such an apparatus has the potential for increased maintenance costs and labor costs to deploy.

U.S. Pat. No. 5,242,206 "Automotive hail blanket" provides another inflatable vehicle cover. The air needed to fill the chambers is designed either coming from an air compressor or from a vehicle tire. Considerable time is obviously needed to inflate and deflate the device; especially if one person is attempting to deploy such a cover on many vehicles in the same area at the same time. In reality, it becomes impractical, especially if an automobile dealership has to deploy hundred's of covers in a short period of time during a sudden hail storm.

U.S. Pat. No. 6,220,648 "Hail protective shield" discloses a design of hail cover and therein multiple layers of shock-absorbing material is used for padding in additional to an outer layer of high density polyethylene material used as the covering. In theory, this device could provide a substantial protection to a vehicle, but the layers vinyl scrim, CCF foam, has to be thick and strong enough to adequately absorb the impact of hail falling at high speed. As a result, this structure increases the stiffness and the weight, thereby it is hard to store and deploy and lacks flexibility required to conform the fit of the cover to the vehicle.

U.S. Pat. No. 6,439,644 "Hail cover for vehicle" presents a device for a cover on a vehicle. This device comprises an air blower, inner chambers and air pressure-relief outlet valves. It is inconvenient that the power supply is always needed when the device is in use, and ineffective where power is interrupted du to a severe hail storm occurring in the area.

Although there are several vehicle cover apparatuses which may have various functions, none of these either separately or in combination with each other, teach or anticipate the current invention. Therefore, there remains an unmet need in the field of vehicle hail proactive covers for a person to use to protect a vehicle which is durable, flexible for deployment and storage, and effective in preventing damage from objects falling onto or colliding with the vehicle during a severe hail storm. The current invention will fulfill this unmet need.

SUMMARY OF INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

To resolve the problems mentioned above, an object of the present invention is to provide a protective vehicle cover that shields the exterior surfaces of a vehicle, which are metal shapes or objects designed to store or transport people or things from place to place such as a cart, automobile or trailer. It is beneficial to protect vehicles constructed of materials which include, but are not limited to, fiberglass, aluminum or other materials, from hail and other falling or moving objects; thereby, reducing the after affect of otherwise exposed impact on the paint, accessories, body panels or glass surfaces of the vehicle from these falling or moving objects.

It is another object of the present invention to provide a protective vehicle cover that is universal in dimension and/or adjustable for a specific vehicle based on its shape and size. A cover that provides the user adjustment capabilities to fit the cover to the vehicle length, width and height and to secure the cover to the vehicle in a way that the cover will retain the dimension until the cover is removed by the user has particular benefit which is found in the present invention.

It is yet another object of the present invention to provide a protective vehicle cover that is light weight, flexible and durable which by its composition can be easily and timely deployed and retrieved by an individual person or group of persons acting together. Because severe weather can occur at any time, the present invention provides users a protection cover that can be deployed quickly. This is particularly important for users that want to protect large numbers of vehicle exposed to the elements such as car dealerships, rental car agencies, fleet managers and such.

It is yet another object of the present invention to provide a protective vehicle cover which can be folded into a small shape then using the outside panels of the cover to form a self-contained carry case; or alternatively, a cover which can easily insert into a separate carry bag or storage case/box for easy storage in a trunk of the vehicle, closet or elsewhere similarly convenient.

The present invention comprises a top protective sheet, bottom sheet and a series of oblique wall pockets (sleeves) assembled between the top and bottom protective sheets in which protective panels are inserted to provide structural support, together which form the vehicle hail protective cover presented herein. The positioning of the wall pockets allow for the protective cover to extend or compact to alter the length of the cover when applied over the vehicle. Additional side panels constructed of impact resistant materials provide protection to the side exteriors as well. Connection points, which are holes or fasteners spaced along the perimeter edges of the panels which can be laced, clipped, snapped, bolted or otherwise secured while deployed, provide the user the mechanism to interconnect panels together. The connectors can be made of single-use materials or reusable materials. The stability of the cover when attached to the vehicle is provided by the cumulative selection of fastening points to the vehicle using the straps, extending or compressing the longitudinal extension of the panels to fit the vehicle dimensions and connecting connectors to connecting points to form a snug fit to the vehicle.

The top sheet which is made of strong material, for instance nylon or other high density cloth material, that provides adequate resistance to the hailstone impact and which is weatherproof and durable enough to withstand exposure to the elements including rain, heat, cold, direct sunlight, wind and of course hail stones. The materials used for stitching, connecting or attaching panels to other panels or the entire cover to the vehicle are durable, weather resistant, easily manipulated and coated or formed of materials that reduce the likelihood of causing damage to the vehicle if contact with the vehicle occurs. The materials selected to form the panels of the cover may also include properties which provide for the application of ink, stencils, decals or other forms of advertisement, brand logos or artwork to display as the cover is deployed or folded when not in use.

Finally, the present invention provides three layers of protection from hailstone impact in a simple and efficient way: The first layer of protection is the top protective sheet which is spaced apart from the bottom protective sheet by using insert support panels to form separation between the top and bottom layers, herein a substantial cushion space between top protective sheet and the bottom protective sheet is created; The second layer of protection is the support panels inserted in oblique wall pocket (sleeves) which has considerable rigidity, enhanced by positioning the inserts at an opposing angle to adjacent sleeves resulting in significant repelling power to hailstone impact; The third layer of protection is the sponge or soft sponge like material which is attached to the seam line at the underside of the bottom protective sheet, it provides additional shock-absorbing feature to the vehicle hail protective cover so that the target vehicle remains isolated from the impacting object. The cover may also be used to protect other items or surfaces including but not limited to tables, fixtures and furniture or may be spread out and used as a blanket for people to rest upon. These alternate applications provide motivation for the user to store the cover conveniently so that when a sudden hail storm develops, the cover is readily accessible.

Still other objects of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein:

FIG. 2A is a perspective view of preferred embodiment structure with top protective sheet, bottom sheet, oblique wall pocket and insert support panel.

FIG. 4 is a perspective view of the vehicle side protective cover.

FIG. 5 is a perspective of the vehicle hail protective cover with the side protective cover attached to an automobile.

FIG. 6 is a perspective view of side protective cover folded, rolled and tied.

FIG. 7 is a perspective view of the vehicle hail protective cover case.

FIG. 8 is a perspective view of the vehicle hail protective cover folded in half size of its width ready for insertion into a case for convenient storage and carry.

FIG. 10 is a perspective view of the insert support panels which can be made with different optional method. It can be made in form of board panels or wire panels.

FIG. 11 is another perspective view of the insert support panels which can be made with different optional method.

FIG. 12 is yet another perspective view of the insert support panels which can be made with different optional method.

DETAILED DESCRIPTION

The claimed subject matter is now described with reference to the drawings. In the following description, for purposes of explanation, numerous specific details are set forth in order to provide a thorough understanding of the claimed subject matter. It may be evident; however, that the claimed subject matter may be practiced with or without any combination of these specific details, without departing from the spirit and scope of this invention and the claims.

Figure 1:
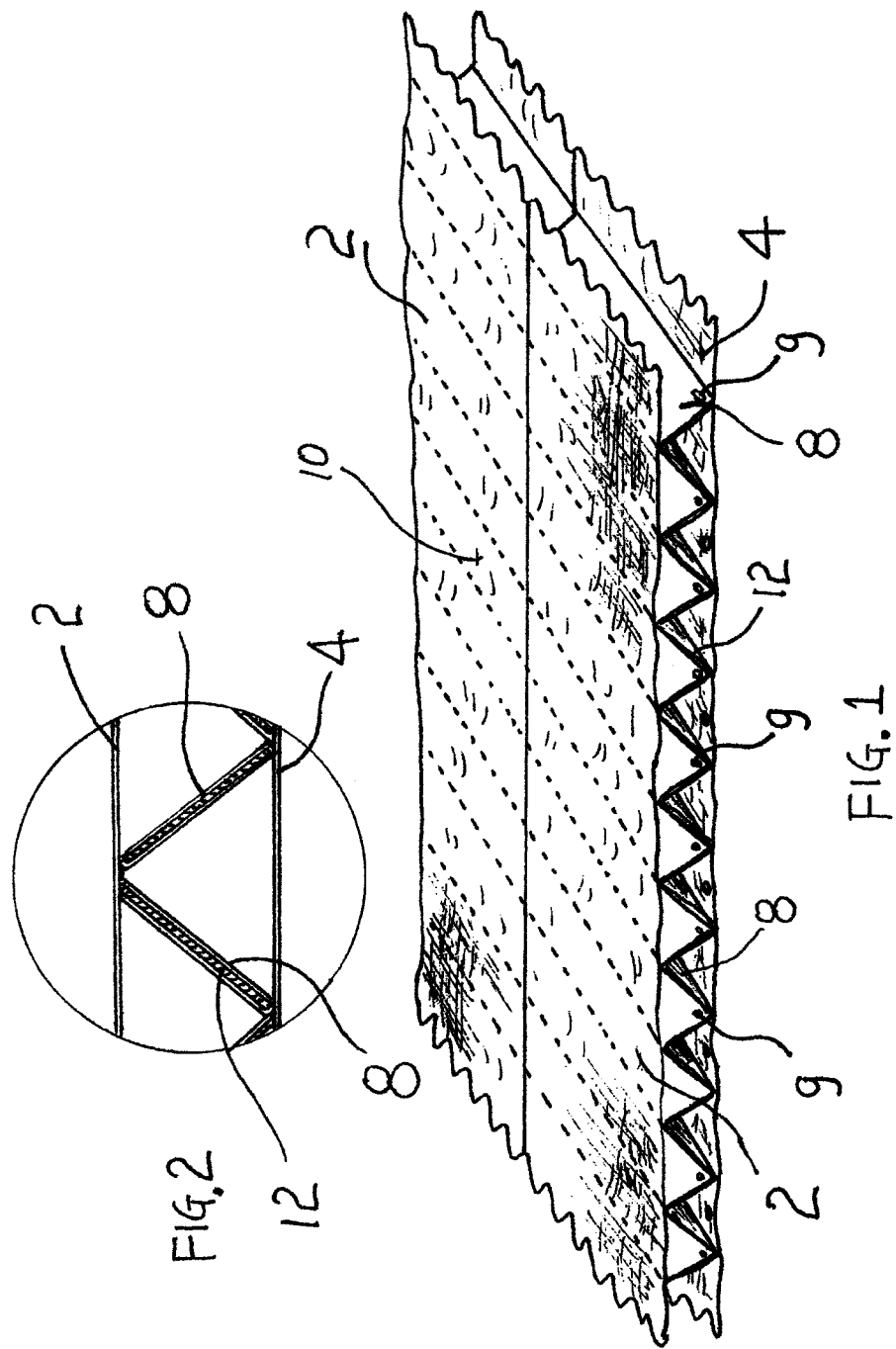
FIG. 1 is a perspective view of the Vehicle hail protective cover.
Figure 2:
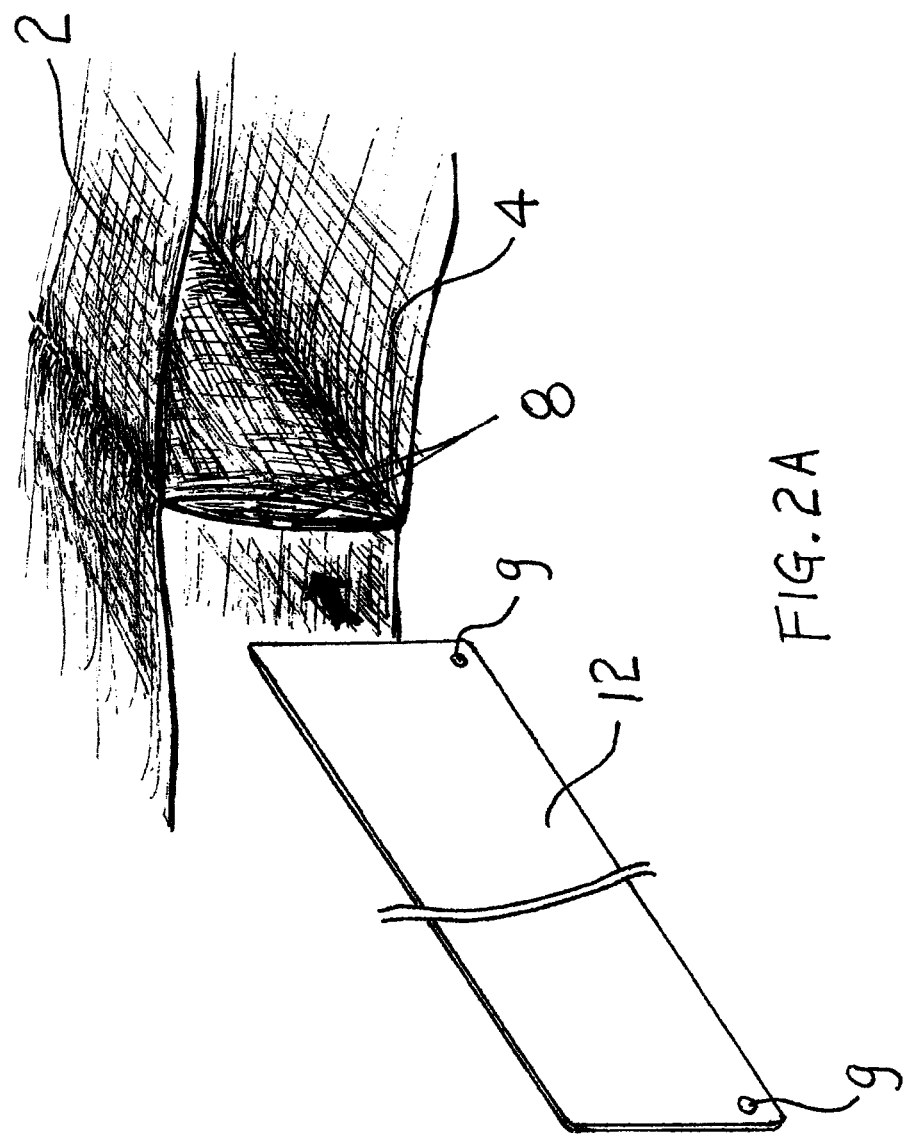
FIG. 2 is a cross-sectional view of the structure of the vehicle hail protective cover.
Figure 9:
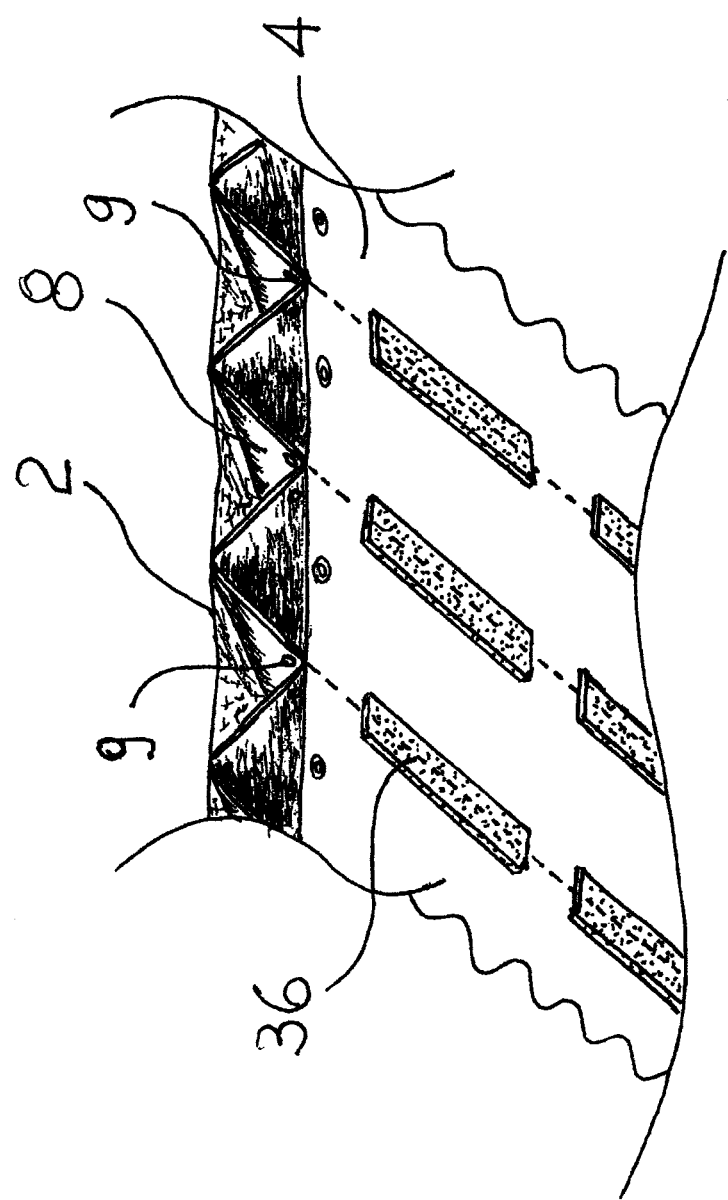
FIG. 9 is a perspective view of vehicle hail protective cover with sponges attached to the underside of the bottom sheet.

FIG. 1 illustrates the construct of the vehicle hail protection cover top panel 10. FIG. 2 illustrates how top protective sheet 2 and bottom protective sheet 4 are attached horizontally to oblique wall pocket (sleeves) 8. FIG. 1 illustrates how longitudinal expansion or compression is accomplished by adjusting the angle at which insert support panels 12, shown in FIG. 2, offset. FIG. 2A illustrates how insert support panels 12 fit into oblique wall packets 8. Insert support panels 12 are shown inserted into adjacent oblique wall pockets 8 at opposing angles in FIG. 2A. FIG. 9 illustrates how scratch resistant, soft shock-absorbing material 36 is attached along the seam lines at the underside of the bottom protective sheet 4.

The upper edge of oblique wall pocket 8 shown in FIG. 2A is securely affixed by means of sewing technique to the top protective sheet 2. The bottom edge of the oblique wall pocket 8 is securely affixed by means of sewing to the bottom protective sheet 4. The insert support panels 12 are inserted in the oblique wall pockets (sleeves) 8.

When the vehicle hail protective cover 11 shown in FIG. 5 is deployed and installed on an automobile 16, the top protective sheet 2 and bottom protective sheet 4 is stretched taut, and the insert support panels 12 are tilting up to strut the top protective sheet 2 up, so that a substantial cushion space between the top protective sheet 2 and bottom protective sheet 4 is created. This resulting structure protects the vehicle 16 from the impact of falling hailstones by absorbing the impact and/or repelling the objects.

This vehicle hail protective vehicle cover top panel 10 in combination with side panels 28 in FIGS. 4 and 5, when deployed shields the exterior surfaces of a vehicle, which includes but is not limited to fiberglass, aluminum or other metal objects designed to store or transport people or things from place to place such as a cart, automobile or trailer, from hail and other falling or moving objects. The result of such shielding reduces the after affect of otherwise exposed impact on the paint, accessories, body panels or glass surfaces of the vehicle from these falling or moving objects.

FIG. 5 illustrates how the top panel 10 is deployed to the horizontal surfaces of an automobile 16. Side panel 28 is shown as connected to top panel 10 using connectors 30 shown in FIG. 4. Fastening straps 26 and 34 are shown in FIG. 5 connecting and securing the top panel 10 to the front bumper 3 and wheels 21 of the automobile. Wheel void 20 and Wheel spoke 18 illustrates where a locking device, such as a cable, may be looped through or around the wheel 21 or wheel components 18 or 20 to secure the cover when the cover is deployed.

FIG. 8 illustrates adjusting the longitudinal expansion or compression of top protective sheet 2, bottom protective sheet 4 and oblique wall pockets 8. The same adjustments can be applied to side panels 28 in FIG. 4 to provided users universal in dimension and/or adjustable for a specific vehicle based on its shape and size. Alternatively, side panels with distinctive small, medium and larger dimensions can be substituted as can be shapes for trucks, trailers or sedans. Those skilled in the art can appreciate the variations that are compatible with the connectors 30 shown in FIG. 4. This attribute provides the user adjustment capabilities to fit the cover 11 to the vehicle length, width and height and to secure the cover 11 to the vehicle in a way that the cover 11 will retain the dimension until the cover 11 is removed by the user. The adjustment capability provides for small, medium and large shapes by way of extending or compressing the longitudinal expanse on the components of the cover 11.

By using the connectors 30 shown in FIG. 4 affixed to connection points 9 shown in FIG. 9, the user can assemble and deploy the vehicle hail protective cover, or may connect multiple cover panels together; each cover panel is modular and can be assembled to provide a continuous cover for greater length, width or height. Deployment includes the physical actions of the user to unfold, place and attach the cover to a vehicle. Retrieval of the cover is accomplished by removing the cover from the vehicle 16, disconnecting the panels 10 and 28 and folding or rolling the cover components to the shape of the storage case 15 shown in FIG. 7 or other suitable container.

Because severe weather can occur at any time, the present invention provides users a protection cover that can be deployed quickly. This is particularly important for users that want to protect large numbers of vehicles exposed to the elements such as car dealerships, rental car agencies, fleet managers and such.

FIG. 8 illustrates how the protective vehicle cover top panel 10 with side panels 28 of FIG. 5 can be folded into a small shape for insertion into a carry case 15 shown in FIG. 7. Alternatively, the outside panels of the top cover 10 can be used in forming a self-contained carry case; or the components can easily be rolled as illustrated in FIG. 6. The rolled cover 32 as shown in FIG. 6 can be inserted into a separate carry bag for easy storage in a trunk of the vehicle, closet or elsewhere similarly convenient.

The first layer of protection is the top protective sheet 2 shown in FIG. 1; which is spaced apart from the bottom protective sheet 4 by the insert support panels 12 contained within the oblique wall pockets (sleeves) 8, wherein a substantial cushion space between top protective sheet 2 and the bottom protective sheet 4 is created;

In FIG. 1, the top protective sheet 2 and bottom protective sheet 4 can be made of strong material, for instance nylon or other high density cloth material, that provides adequate resistance to the hailstone impact and which is weatherproof and durable enough to withstand exposure to the elements including rain, heat, cold, direct sunlight, wind and of course hail stones, the preferred embodiment uses nylon or nylon like strong cloth material which is strong enough to withstand and repel the impact of falling hailstones. The top protective sheet 2 is in rectangular shape and its length is sufficient to span the distance from the front bumper to the rear bumper of the target vehicle, and a few inches wider than the width of the target vehicle, so that the top of the target vehicle is completely covered. A bottom protective sheet 4 is approximately the same dimension as the top protective sheet 2. Alternatively, sections of covers forming modules may be connected together to fit the length and width desired.

A series of oblique wall pockets (sleeves) 8 as shown in FIG. 2A are securely affixed by means of sewing to the top protective sheet 2 and the bottom protective sheet 4; Insert support panels 12 are inserted in oblique wall pockets (sleeves) 8 so that the cushion space between the top protective sheet and the bottom protective sheet is created; In the preferred embodiment, sponge or sponge like soft shock-absorbing material 36 as shown in FIG. 9 is attached along the seam lines at the underside of the bottom protective sheet 4 to provide more impact absorbing power and to be more paint-friendly to the target vehicle 16.

Figure 3:
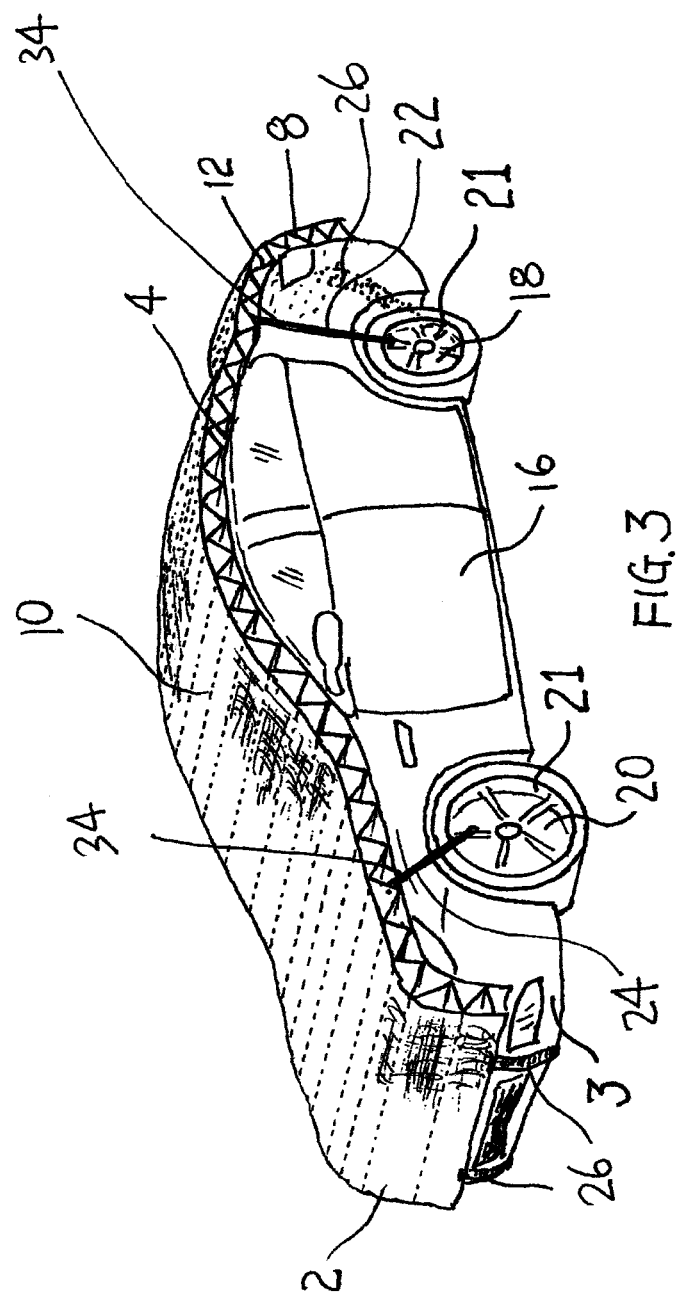
FIG. 3 is a perspective view of the vehicle hail protective cover when attached to an automobile.
Figure 14:
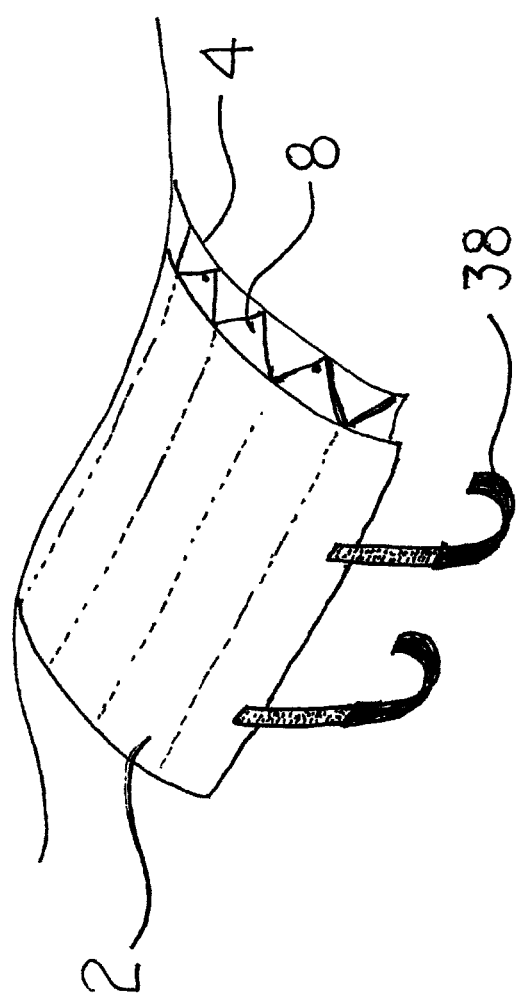
FIG. 14 is a perspective of fasteners used to secure the cover to the vehicle.

In the preferred embodiment, eight fastening straps 26 and 34 as shown in FIG. 3 or more if necessary are attached to the vehicle hail protective cover, there are two straps 26 on the front and rear of the vehicle cover and two straps 34 on both sides of the vehicle cover, hooks 38 as shown in FIG. 14 are affixed to the other end of the straps and to be hooked to the front and rear bumper, voids 20 as shown in FIG. 5 of the in wheels 21 or other suitable attachment points such as wheel spokes 18, in order to hold the vehicle cover 10 tightly attached to the top of the target vehicle 16. The straps are elastomeric and adjustable, the hooks 38 may be made of varies materials with paint-friendly characteristics and in the shapes we known to those of ordinary skills in the art.

Figure 13:
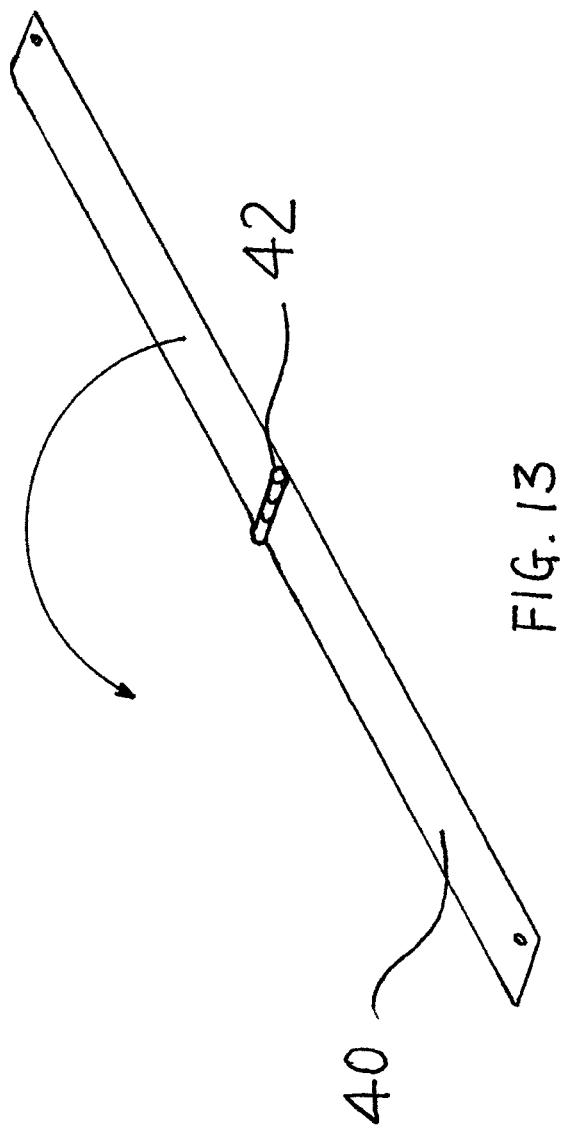
FIG. 13 is a perspective of insert support panel in full size that can be folded in half of its length for easy storage.

The second layer of protection is the insert support panels 12 as shown in FIG. 2A and alternatively 40 in FIG. 13, which are inserted into oblique wall pocket (sleeves) 8 which have considerable rigidity and which slant at an opposing angle to adjacent sleeves to form significant repelling power to hailstone impact; the insert support panel 12 may also be equipped with a hinge 42 forming insert support panel 40, where the hinge 42 is positioned at an intermediate point along the insert support panel 40 to allow the insert support panel 40 to fold during storage. The hinge 42 provides an action located at an intermediate point along the longitudinal span of the insert support panel 40 to fold the panel in order to shorten the length of the panel for easy storage; multiple hinges can be positioned at various intermediate points long the longitudinal span of the insert support panel 40 to fold the insert support panel to the users desire length for storage. The hinge 40 can be made of metal or plastic or can be a piece of durable cloth which is affixed on both ends of the insert support panel 40 segments. The hinge 42, if equipped on the insert support panels 40, else insert support panel 12 as shown allows the user the option in the preferred embodiment to retain the insert support panel 12 inside the oblique wall pocket (sleeves) 8 completely when folding or storing the cover; or, to remove the insert support panels 12 or 40 from the oblique wall pocket (sleeves) 8 so that the cloth portion of the vehicle hail protective cover can be collapsed and folded into a small package for easy storage and the insert support panels 12 or 40 stored separately.

The third layer of protection is the sponge or soft sponge like material 36 as shown in FIG. 9 which is attached to the seam line at the underside of the bottom protective sheet 8, it provides additional shock-absorbing feature to the vehicle hail protective cover so that the target vehicle 16 remains isolated from the impacting object.

The top protective sheet 2 and bottom protective sheet 4 are each in same size and rectangular in shape. The preferred length of the cover is the same measurement as is the span from front bumper to rear bumper along the exterior contour of the target vehicle, the preferred width of the cover is the same measurement as is the span from side to side along the exterior contour of the vehicle, plus a few inches wider on each side of the width of the target vehicle 16 so that the entire top contour of the target vehicle 16 is covered by the cover.

Two vehicle side protective covers 28 as shown in FIG. 4 are attached from both sides to vehicle hail protective cover top panel 10 utilizing several connecting anchors 30 as shown in FIG. 4. The vehicle side protective cover 28 is made of sponge or soft sponge like material and the shape of the anchors is well known to those of ordinary skills in the art.

Connection points 9 shown in FIG. 9, which are holes or fasteners spaced along the perimeter edges of the panels which can be laced, clipped, snapped, bolted or otherwise secured while deployed, provide the user the mechanism to interconnect panels 10 and 28 together. The connectors 30 can be made of single use materials or reusable materials, which are made or coated with materials that will not damage the paint or exterior surfaces of the vehicle should the connectors 30 or connection points 9 make contact with the exterior surface of the vehicle 16.

The stability of the cover when attached to the vehicle 16 is provided by the cumulative selection of fastening points to the vehicle using the straps 26 and 34 as shown in FIG. 3, extending or compressing the longitudinal extension of the panels to fit the vehicle dimensions and connecting connectors 30 shown in FIG. 4 to connecting points 9 shown in FIG. 9 to form a snug fit to the vehicle.

The materials used for stitching, connecting or attaching panels 10 or 28 to other panels 10 or 28 or the entire cover 11 to the vehicle are durable, weather resistant, easily manipulated and coated or formed of materials that reduce the likelihood of causing damage to the vehicle 16 if contact with the vehicle 16 occurs. The materials selected to form the panels 10 or 28 of the cover 11 may also include properties which provide for the application of ink, stencils, decals or other forms of advertisement, brand logos or artwork to display as the cover is deployed or folded when not in use.

The cover 11 may also be used to protect other items or surfaces including but not limited to tables, fixtures and furniture or may be spread out and used as a blanket for people to rest upon. These alternate applications provide motivation for the user to store the cover 11 conveniently so that when a sudden hail storm develops, the cover is readily accessible.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A vehicle hail protective cover apparatus comprising an accordion type top panel, an accordion type right side panel, an accordion type left side panel each panel which has a top and bottom protective sheet and interior void spaces in between the top and bottom protective sheets created by an intermediate separation layer consisting of a flexible truss structure of adjacent triangular formations, a plurality of adjustable connector points, and a plurality of adjustable fastening straps used to deflect falling objects from striking the outer surfaces of a vehicle.

2. The vehicle hail protective cover apparatus of claim 1, wherein the flexible truss structure of adjacent triangular formations comprising of: a plurality of inner sleeves, including a first inner sleeve, a last inner sleeve and intermediate inner sleeves, each having two sides and two edges which the top of each side is attached along the top edge to a top seam with the top protective sheet sewn transverse to the longitudinal span of the top protective sheet; and, which the bottom of each side is attached along the bottom edge to a bottom seam with the bottom protective sheet sewn transverse to the longitudinal span of the bottom protective sheet; and, a plurality of insert support panels which are inserted into each inner sleeve.

3. A vehicle hail protective cover apparatus comprising a top protective sheet, bottom protective sheet, an intermediate layer and a plurality of seams joining the intermediate layer to the top protective sheet and to the bottom protective sheet wherein scratch resistant, soft shock-absorbing fabric material is attached to the underside of the bottom protective sheet along individual seams within the plurality of seams, formed when attaching the bottom protective sheet to the intermediate layer, which are spaced at intervals across the bottom protective sheet; and, which are used to attach the intermediate layer to the bottom protective sheet, to provide impact absorbing attributes and protection to the vehicle.

* * * * *